United States Patent
Wang et al.

(10) Patent No.: US 10,832,836 B2
(45) Date of Patent: Nov. 10, 2020

(54) LIGHTNING INDUCTION-TYPE SOLID-PHASE ARC-EXTINGUISHING LIGHTNING PROTECTOR

(71) Applicant: Nanning Supervolt Electric Technology Co., Ltd., Guangxi (CN)

(72) Inventors: Yanlei Wang, Guangxi (CN); Jufeng Wang, Guangxi (CN)

(73) Assignee: Nanning Supervolt Electric Technology Co., Ltd., Guangxi (CN)

(*) Notice: Subject to any disclaimer, the term of this patent is extended or adjusted under 35 U.S.C. 154(b) by 32 days.

(21) Appl. No.: 16/095,472

(22) PCT Filed: Jun. 14, 2017

(86) PCT No.: PCT/CN2017/000386
§ 371 (c)(1),
(2) Date: Oct. 22, 2018

(87) PCT Pub. No.: WO2018/040452
PCT Pub. Date: Mar. 8, 2018

(65) Prior Publication Data
US 2019/0139683 A1    May 9, 2019

(30) Foreign Application Priority Data
Aug. 28, 2016  (CN) .......................... 2016 1 0747255

(51) Int. Cl.
*H01B 17/46*  (2006.01)
*H01T 4/10*   (2006.01)
(Continued)

(52) U.S. Cl.
CPC ............. *H01B 17/46* (2013.01); *H01B 17/38* (2013.01); *H01B 17/48* (2013.01); *H01T 1/02* (2013.01);
(Continued)

(58) Field of Classification Search
CPC ...... H01B 17/46; H01B 17/48; H01B 17/378; H01B 17/42; H01B 17/38; H01T 4/10;
(Continued)

(56) References Cited

U.S. PATENT DOCUMENTS

| 5,283,709 A | * | 2/1994 | Shirakawa | ............. | H02G 13/00 |
| | | | | | 361/117 |
| 6,002,571 A | * | 12/1999 | Joulie | .................... | H02G 13/80 |
| | | | | | 361/117 |
| 6,875,915 B1 | * | 4/2005 | Chung | .................. | H02G 13/00 |
| | | | | | 135/96 |

FOREIGN PATENT DOCUMENTS

| CN | 103368075 A | 10/2013 |
| CN | 203367745 U | 12/2013 |

(Continued)

OTHER PUBLICATIONS

International Search Report for PCT/CN2017/000386, dated Sep. 13, 2017.
(Continued)

*Primary Examiner* — Pete T Lee
(74) *Attorney, Agent, or Firm* — Barnes & Thornburg LLP; Ryan L. Marshall

(57) ABSTRACT

Provided in the present disclosure is a lightning induction-type solid-phase arc-extinguishing lightning protector. The lightning protector primarily including a lightning protector housing, an arc-extinguishing rotating disk, a conductive metal plate, an arc-striking rod, a fastening rod, an inductive coil, an arc-extinguishing cylinder, and a counter arm. The arc-extinguishing rotating disk is mounted within the lightning protector housing, and a planar torsion spring is provided at a center of the arc-extinguishing rotating disk for driving the arc-extinguishing rotating disk to rotate; the conductive metal plate is mounted at an upper portion of the arc-extinguishing rotating disk; several arc-extinguishing (Continued)

air-jet members are provided around a circumferential direction of the arc-extinguishing rotating disk, each of the arc-extinguishing air-jet members is provided with a trigger electrode and a recess on one side thereof, and the trigger electrode has one end connected to one of triggering ends of the arc-extinguishing air-jet member by means of a wire, and the other end extending beyond an edge of the arc-extinguishing rotating disk; the other triggering end of the arc-extinguishing air-jet member is connected to a metallic conductive strip by means of a wire. The present disclosure has the advantages of simple structure, reasonable design, improved arc-extinguishing performance, and stable operation, and convenience in replacement of the arc-extinguishing air-jet members.

10 Claims, 4 Drawing Sheets

(51) Int. Cl.
*H01T 1/02* (2006.01)
*H02G 13/00* (2006.01)
*H01B 17/48* (2006.01)
*H01B 17/38* (2006.01)
*H01T 1/08* (2006.01)

(52) U.S. Cl.
CPC .............. *H01T 1/08* (2013.01); *H01T 4/10* (2013.01); *H02G 13/80* (2013.01)

(58) Field of Classification Search
CPC . H01T 1/08; H01T 1/02; H02G 13/80; H02G 13/00
USPC .................................. 174/2, 3; 361/212, 222
See application file for complete search history.

(56) References Cited

FOREIGN PATENT DOCUMENTS

| | | |
|---|---|---|
| CN | 106374338 A | 2/2017 |
| CN | 106451077 A | 2/2017 |
| CN | 206041200 U | 3/2017 |
| CN | 206195154 U | 5/2017 |

OTHER PUBLICATIONS

Notice of Allowance and Translation of Claims as Granted for Chinese Application No. 201610747255.3 with English Translation, dated Mar. 23, 2018.
First Office Action for Chinese Application No. 201610747255.3 with English Translation.
Second Office Action for Chinese Application No. 201610747255.3 with English Translation.

* cited by examiner

LIGHTNING INDUCTION-TYPE SOLID-PHASE ARC-EXTINGUISHING LIGHTNING PROTECTOR

CROSS REFERENCE TO RELATED APPLICATIONS

This application is a 371 national phase of PCT/CN2017/000386, filed Jun. 14, 2017, which claims the benefit of the filing date of Chinese Application No. 201610747255.3, filed Aug. 28, 2016, the disclosures of which are incorporated, in their entirety, by this reference.

FIELD OF TECHNOLOGY

The present disclosure relates to a lightning-protection device for transmission lines, and particularly to a lightning induction-type solid-phase arc-extinguishing lightning protector.

BACKGROUND

Lightning is an important factor that affects the safety of transmission lines and has been the primary reason causing tripping in the line fault for a long time, and it is a natural process of atmospheric activity and has been uncontrollable so far. However, the precautions against lightning can be strengthened by finding the law of lightning strikes through analyzing the frequent accidents. For example, poles and towers in the mountains or peaks, transmission lines near ponds or reservoirs, poles and towers spanning mountains or rivers and lakes, poles and towers and rocky tower footings as well as transmission lines installed with high grounding resistance are the main objects vulnerable to lightning strikes.

Lightning strikes will bring different forms of damage and destruction to the power facilities. Thundercloud discharges will cause lightning overvoltage in the power system. The overvoltage common in overhead lines comprises overvoltage in the transmission lines caused by the lightning strikes near the overhead lines through electromagnetic induction, and overvoltage generated by the direct striking of the lightning on the wires. The overvoltage due to the lightning strikes may cause damage to insulators and transmission lines. The flashover strike of the insulator due to the lightning strikes causes the burnout on porcelain surfaces or the mesh cracks on glass insulators, resulting in a significant reduction of the insulation strength. Lightning strikes on the transmission wires or the lightning conductor may cause broken stand or even breakage, resulting in a failure of the power transmission.

The lightning protection of transmission lines has always been an important part of lightning protection work for the power sector. The lightning disturbance is still one of the important factors affecting the safety of power grids. The impulse flashover, caused by the lightning strikes on the transmission lines, causes the flashover of the insulators in the lines, which then causes a large power-flow current, damages the insulator string and the fitting, resulting in line accidents. In order to protect the transmission lines, the power sector generally installs lightning protectors on the transmission lines.

Arc is free gas with high temperature and high conductivity. Extinguishing the arc is referred to as arc-extinguishing. There are many ways to extinguish arc, most of which use a certain gas or liquid to undertake the main arc-extinguishing work.

The lightning protector is an electrical device capable of releasing lightning or releasing the operation overvoltage energy of the power system to protect the electrical equipment from the damage of transient overvoltage as well as cutting off the freewheeling to avoid the grounded short circuit of the system.

For example, Chinese patent No. 201110090288.2 discloses an injecting-gas arc-extinguishing lightning-protection gap device within 10-35 kV overhead electric power transmission line constraint space suitable for 10-35 kV overhead electric power transmission lines, and Chinese patent No. 200710066259.6 discloses an injecting-airflow arc-extinguishing lightning-protection gap device for the electric power transmission lines of various voltage levels constraint space, both of which are installed in parallel at both ends of the line insulator string, and the flashover voltage between the protection gaps is smaller than the protection insulator string, so that the devices breaks down prior to the protection insulator string when the electric power transmission line is struck by lightning. During disruptive discharge, while the gas generating material inside the constraint space is heated dramatically by the high temperature arc to generate high pressure gas, the signal collecting device automatically collects the signal and activates the injecting gas generating device to instantaneously generate high-speed airflow to impact the arc in the longitudinal direction, so as to cool the arc to extinction. The arc extinguishing ability thereof is weak.

For example, Chinese patent No. 2013102977897 discloses a segmented arc-extinguishing lightning-protection gap device bin for different voltage levels, in which, by adopting a disk-shaped arc-extinguishing projectile storage bin, a large number of projectiles capable of generating gas for arc extinguishing after being triggered can be placed and the arc-extinguishing projectiles are closely arranged in the projectile storage track of the arc-extinguishing storage bin I through the torsion force of the flat spiral spring, so that the next arc-extinguishing projectile can automatically enter the projectile triggering position after the current arc-extinguishing projectile is triggered to fall, thereby realizing the automatic projectile reloading. Although the shortcomings of less arc-extinguishing projectiles and less number of effective arc extinguishing are overcome, it does not have a counting function.

Although the patents above have played a very good role in lightning protection, there are still some shortcomings that the arc-extinguishing device is only provided on one electrode, and it is difficult to achieve the intercepting of the arcing point and extinguishing of the arc when the arc is stricken on the other electrode. Since the discharge counter is large in size, it is difficult to be arranged in some specific occasions, and it is weak in anti-interference ability, easy to generate wrong counts, and the data cannot be stored and needs to be manually recorded, thereby wasting a large amount of labor.

SUMMARY

In view of the deficiencies of the prior art, the present disclosure aims to provide a lightning induction-type solid-phase arc-extinguishing lightning protector having the advantages of a simple structure, reasonable design, improved arc-extinguishing performance, and stable operation, and convenience in replacement of the arc-extinguishing air-jet members.

In order to achieve the object above, the present disclosure adopts the following technical solutions:

In one of the embodiments, a lightning induction-type solid-phase arc-extinguishing lightning protector is fixedly mounted, by means of a link fitting, on a crossarm or at one end of a insulator string; the lightning induction-type solid-phase arc-extinguishing lightning protector primarily includes a lightning protector housing, an arc-extinguishing rotating disk, a conductive metal plate, a planar torsion spring, an arc-striking rod, a fastening rod, an inductive coil, an arc-extinguishing cylinder, a counter arm, an upper cover and a rotating shaft; an air-jet member triggering position is provided at the bottom of the lightning protector housing and the arc-extinguishing cylinder is mounted below the air-jet member triggering position; the fastening rod is fixedly mounted at the edge of the air-jet member triggering position; the arc-striking rod has one end connected to the link fitting and the other end extending through the inductive coil to the arc-extinguishing cylinder; one end of wire of the inductive coil is connected to the fastening rod, the other end thereof is in sliding contact with the conductive metal plate; the arc-striking rod passes through the inductive coil, when flashover just occurs in an air gap, since the change rate of current passing through the arc-striking rod at a starting point of arc (i.e. the lightning arc current) is the largest, an induced voltage of the inductive coil is the largest and a secondary current generated is the largest, which is enough to trigger arc-extinguishing air-jet members, so that simultaneity of the starting point of the arc, a starting point of the secondary current and a starting point of airflow arc extinguishing is achieved, the arc-extinguishing effect for restricting strength by speediness is realized, and the arc can be immediately extinguished at a moment when the arc is ignited; the counter arm is provided below the lightning protector housing and fixed to an axis position of the arc-extinguishing rotating disk; the arc-extinguishing rotating disk is mounted within the lightning protector housing, a center position of an upper portion of the arc-extinguishing rotating disk is connected to the upper cover of the lightning protector housing via the rotating shaft, the arc-extinguishing rotating disk can rotate around the rotating shaft, and the planar torsion spring for rotating the arc-extinguishing rotating disk is provided at a central position of the arc-extinguishing rotating disk, a lower portion of the arc-extinguishing rotating disk is substantially in contact with a protruding gasket provided at the arc-extinguishing cylinder within the lightning protector housing, and has a gap with a non-protruding portion within the lightning protector housing; the conductive metal plate is mounted at the upper portion of the arc-extinguishing rotating disk; several arc-extinguishing air-jet members are provided around a circumferential direction of the arc-extinguishing rotating disk, each of the arc-extinguishing air-jet members is provided with an L-shaped trigger electrode and a recess on one side thereof, and the L-shaped trigger electrode has one end connected to one of triggering ends of the arc-extinguishing air-jet member by means of a wire, and a rear portion of the L-shaped trigger electrode extends beyond an edge of the arc-extinguishing rotating disk; the other triggering end of the arc-extinguishing air-jet member is connected to the conductive metal plate via a wire.

In the lightning induction-type solid-phase arc-extinguishing lightning protector of the present disclosure, a unique fastening and unfastening mode is adopted, that is, when the arc-extinguishing air-jet member is in the air-jet member triggering position, the rear portion of the L-shaped trigger electrode is fastened by the fastening rod until the arc-extinguishing air-jet member is triggered, the arc-extinguishing air-jet member generates strong airflow after being triggered, so that the L-shaped trigger electrode at the recess is bent along the recess, the rear portion of the L-shaped trigger electrode is retracted into the arc-extinguishing rotating disk so as to be unfastened successfully such that the arc-extinguishing rotating disk can be rotated through the planar torsion spring until the next arc-extinguishing air-jet member enters the air-jet member triggering position, and the L-shaped trigger electrode matched with the arc-extinguishing rotating disk is again fastened by the fastening rod.

In the present disclosure, by designing the fastening structure, it can ensure that not only the entire rotating mechanism can reliably rotate and reliably stop, but also the triggering end of the arc-extinguishing air-jet member and the trigger electrode of the solid-phase lightning protector are in smooth contact so that the triggering is reliable. Since the L-shaped trigger electrode is long enough and thick enough, it is fastened stably, and can be reliably unfastened after the air-jet member is triggered, so as to prevent the arc-extinguishing rotating disk from false tripping. The planar torsion spring mounted inside the arc-extinguishing rotating disk sleeves the rotating shaft, and one to n of the planar torsion spring is mounted as needed, and when sufficient power is supplied, the more springs used, the smaller the force provided by each spring, and the smaller the deformation and more stable it is. The conductive metal plate mounted at the upper portion of the arc-extinguishing rotating disk can not only ensure that each arc-extinguishing air-jet member conducts the current to trigger, but also resist the recoil force when the arc-extinguishing air-jet member is triggered. Providing the protruding gasket at the arc-extinguishing cylinder (at the triggering position of the air-jet member) is also an effective way to reduce the friction; meanwhile the triggering action of the arc-extinguishing air-jet member may generate debris, and providing the protruding gasket may leave a gap between the arc-extinguishing rotating disk and the bottom of the housing to ensure that the debris does not affect the normal rotation of the arc-extinguishing rotating disk.

In the further illustration of the present disclosure, the bottom or side of the lightning protector housing described above is provided with a numeral mark or a mark of different colors. In this way, it is reliable and convenient to read the counting, and facilitates replacing the arc-extinguishing rotating disk in time.

In the further illustration of the present disclosure, the recess described above is a semi-circular recess.

In the further illustration of the present disclosure, the fastening rod and the arc-striking rod described above are iron metal rods or copper metal rods.

In the further illustration of the present disclosure, the arc-extinguishing cylinder described above has a three-segment structure, that is, three segments of the arc-extinguishing cylinders are connected by a thread connection. The three-segment structure is mainly effective in water-proofing when the lightning protector of the present disclosure is mounted upward, so that the rainwater will not flow into the arc-extinguishing cylinder.

In the further illustration of the present disclosure, the lightning protector housing and the upper cover described above are connected by a shaft, and the arc-extinguishing rotating disk is replaced by opening the upper cover; or the lightning protector housing is assembled by two or more parts P1, P2 and P3, each part is also connected by a shaft S, and the arc-extinguishing rotating disk is replaced by rotating one part or several parts. The reference number S in FIG. 1 representing the shaft and the reference numbers P1, P2 and P3 in FIG. 1 representing the two or more parts are a schematic and in no way is meant to represent a particular orientation, size, or other physical characteristic of the shaft and the two or more parts.

In the further illustration of the present disclosure, the planar torsion spring described above is mounted inside the arc-extinguishing rotating disk and fixed to the upper cover by the rotating shaft, and one to n of the planar torsion springs are mounted as needed, and when sufficient power is supplied, the more springs used, the smaller the force provided by each spring, and the smaller the deformation and more stable it is.

In the present disclosure, the lightning induction-type solid-phase arc-extinguishing lightning protector has three cooperation modes with a lower electrode (i.e. the lower portion of the insulator string): a. the lightning induction-type solid-phase arc-extinguishing lightning protector is mounted at the upper end of the insulator string, and a pure arc-striking electrode is mounted at an lower end of the insulator string; b. the lightning induction-type solid-phase arc-extinguishing lightning protector is mounted at the upper end of the insulator string, and a overhead transmission line constraint-space injecting-gas arc-extinguishing lightning-protection gap device disclosed in Patent No. 201110090288.2 is installed at the lower end of the insulator string; c. the lightning induction-type solid-phase arc-extinguishing lightning protectors are respectively mounted at both the upper end and lower end of the insulator string.

Cooperation mode c is used for transmission lines with a voltage level higher than 220 kV, the lightning induction-type solid-phase arc-extinguishing lightning protectors are respectively mounted at both the upper end and lower end of the insulator string. For different lightning strike modes, since the gap of 220 kV parallel is longer when the lower electrode strikes the arc, the arc may not smoothly enter the arc-extinguishing cylinder of the upper electrode and float to the foot of the fitting or the insulator under the external force such as wind, at this time the device mounted at the lower electrode can effectively extinguish the arc with reliable action. By using the arrangement in which the upper and lower electrodes are provided with the arc-extinguishing cylinders to cooperate insulatively, the cutting of the arcing point and the arc extinguishing are realized, so as to ensure at least one arc extinguishing point for the arc channel.

The working process (working principle) of the present disclosure is as follows:

For a transmission line of a voltage level of 110 kV, the high voltage electrode is fixed on the wire, the graphite is used as the arc-striking electrode, and the lightning induction-type solid-phase arc-extinguishing lightning protector is provided with the arc-striking electrode (the arc-striking rod), so as to ensure that the arc can be formed around the defined track, that is, the main gap, and smoothly enter the lightning induction-type solid-phase arc-extinguishing lightning protector, thereby preventing the arc from flashover along the surface of the insulator string and burning the insulator to generate the arc. After the arc enters the arc-striking rod of the lightning induction-type solid-phase arc-extinguishing lightning protector, since a Rogowski coil (inductive coil) sleeves the arc-striking rod, the arc causes the Rogowski coil to induce current. One end of the Rogowski coil is connected to the fastening rod of the solid-phase arc-extinguishing lighting protector, and the other end of the Rogowski coil is connected to the common electrode (conductive metal plate) of the arc-extinguishing air-jet member. The arc-extinguishing air-jet member has two triggering ends, one of which is connected to the fastening rod of the solid-phase arc-extinguishing lightning protector through the fastening end of the trigger electrode, and the other of which is a common electrode (conductive metal plate) connected to the Rogowski coil, so that once the arc is generated, the entire circuit is turned on, and the arc-extinguishing air-jet member acts smoothly to cut off the arc. After the completion of the action, since the arc-extinguishing air-jet members are independently placed in a disc-shaped rotating disk mechanism (arc-extinguishing rotating disk) in which a rotating mechanism (the planar torsion spring) is packaged, once an arc-extinguishing air-jet member acts, the position of the arc-extinguishing air-jet member looses, the rotating disk rotates to the position of the next arc-extinguishing air-jet member which fastens the fastening rod of the solid-phase arc-extinguishing lightning protector. The action is repeated. The arc-extinguishing rotating disk is connected to the counter arm of the counter, and the number of the actions of the arc-extinguishing air-jet members is found outside the solid-phase arc-extinguishing lightning protector or at the bottom of the solid-phase arc-extinguishing lightning protector. The pointer rotates once for each action and points to the corresponding number or color. When the arc-extinguishing air-jet members are run out, the upper cover of the solid-phase arc-extinguishing lightning protector may be removed to replace the rotating disk. Therefore it can be reused and is easy to assemble.

For a transmission line with a voltage level of 220 kV, the lightning induction-type solid-phase arc-extinguishing lightning protectors may be mounted at both ends of the insulator string, and the lower end of the solid-phase arc-extinguishing lightning protector mounted below is the root fixed to the insulator. The solid-phase arc-extinguishing lightning protector is connected to the wire, which can ensure that the arc is stricken on the solid-phase arc-extinguishing lightning protector, and will not flashover at the root of the insulator; and the arc arc-extinguishing cylinder is in a waterproof structure design, which can be free of the influences of the rain and the like.

For the lightning induction-type solid-phase arc-extinguishing lightning protector used in a transmission line with a voltage level of 220 kV in an area where icing flashover occurs easily, there is deviation between the crossarm and the wire of two devices, and the deviation is realized by the fitting during installation. The deviation may be a front-to-back positional deviation or a left-right angular deviation. This is to prevent the ice barriers, that is, to prevent the ice flashover.

ADVANTAGES OF THE PRESENT DISCLOSURE

1. Simple structure, reasonable design, strong arc-extinguishing performance, and stable operation. The designed fastening structure can ensure that not only the entire rotating mechanism can reliably rotate and reliably stop, but also the triggering end of the arc-extinguishing air-jet member and the trigger electrode of the solid-phase lightning protector are in smooth contact so that the triggering is reliable. The rotating mechanism is packaged as a whole, and the problems such as moisture, rust, rot, etc., will not occur, and it is provided with a waterproof structure which can reliably ensure the stability of the mechanism.

2. Countable, easier for maintenance and replacement at later stage. When the arc-extinguishing air-jet members of this device are run out, the whole arc-extinguishing rotating disk may be replaced by opening the upper cover of the solid-phase arc-extinguishing lightning protector so as to realize a quick supplement of the arc-extinguishing air-jet member, so that the manpower and material resources is fully reduced and the reliability of the lightning protection is increased.

Figure 1:
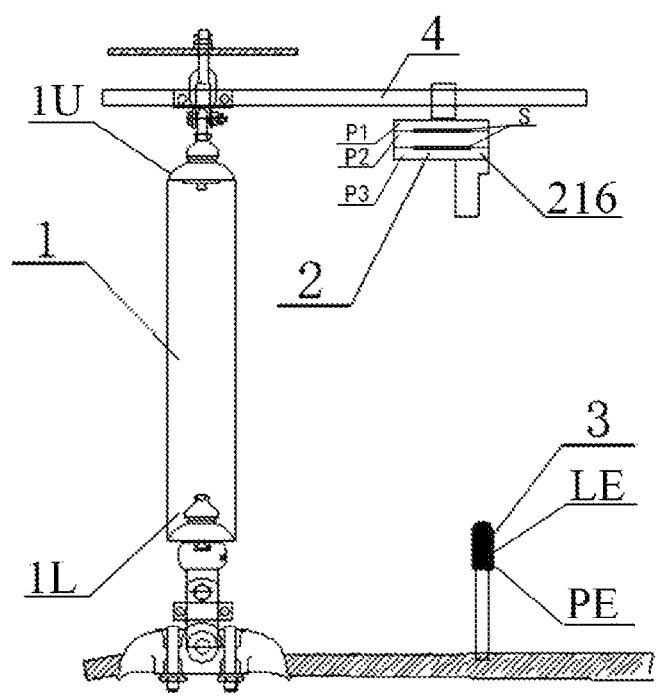
FIG. 1 is an assembling diagram of an embodiment of the present disclosure.

Reference numbers: 1—insulator string, 2—lightning induction—type solid-phase arc-extinguishing lightning protector, 3—high voltage electrode, 201—lightning protector housing, 202—arc-extinguishing rotating disk, 203—conductive metal plate, 204—planar torsion spring, 205—arc-extinguishing air-jet member, 206—L-shaped trigger electrode, 210—arc-extinguishing cylinder, 211—protruding gasket, 212—counter arm, 213—recess, 214—rotating shaft, 215—upper cove, 1U—upper end of insulator string, 1L—lower end of insulator string, 202A—axis position, 202U—upper portion, 202UC—center position, 202C—central position, 202L—lower portion, 201NP—non-protruding portion, 209W—first wire, W2—second wire, W3—third wire, 206R—rear portion of the L-shaped trigger electrode, 202E—edge of the arc-extinguishing rotating disk, 201B—the bottom of the lightning protector housing, 201S—side of the lightning protector housing, TS—three-segment structure; P1, P2 and P3—two or more parts, TC—thread connection, S—shaft, PE—pure arc-striking electrode, LE—lower electrode, 216—air-jet member triggering position, 4—link fitting.

DETAILED DESCRIPTION

The present disclosure will be further described hereinafter with reference to the drawings and embodiments.

Embodiment 1

As shown in FIGS. 1-4, a lightning induction-type solid-phase arc-extinguishing lightning protector is fixedly mounted at one end of an insulator string by means of a link fitting 4. The lightning induction-type solid-phase arc-extinguishing lightning protector primarily includes a lightning protector housing 201, an arc-extinguishing rotating disk 202, a conductive metal plate 203, a planar torsion spring 204, an arc-striking rod 207, a fastening rod 208, an inductive coil 209, an arc-extinguishing cylinder 210, a counter arm 212, an upper cover 215 and a rotating shaft 214. An air-jet member triggering position 216 is provided at the bottom of the lightning protector housing 201 and the arc-extinguishing cylinder 210 is mounted below the air-jet member triggering position 216; the fastening rod 208 is fixedly mounted at the edge of the air-jet member triggering position 216; the arc-striking rod 207 has one end connected to the link fitting and the other end extending through the inductive coil 209 to the arc-extinguishing cylinder 210; one end of a first wire 209W of the inductive coil 209 is connected to the fastening rod 208, the other end thereof is in sliding contact with the conductive metal plate 203; the arc-striking rod 207 passes through the inductive coil 209, when flashover just occurs in an air gap, since the change rate of the current passing through the arc-striking rod 207 at the starting point of the arc is the largest, the induced voltage of the inductive coil 209 is the largest and the secondary current generated is the largest, which is enough to trigger arc-extinguishing air-jet members, so that the simultaneity of the starting point of the arc, the starting point of the secondary current and the starting point of airflow arc extinguishing is achieved, the arc-extinguishing effect restricting strength by speediness is realized, and the arc can be immediately extinguished at the moment when the arc is ignited; the counter arm 212 is provided below the lightning protector housing 201 and fixed to an axis position 202A of the arc-extinguishing rotating disk 202; the arc-extinguishing rotating disk 202 is mounted within the lightning protector housing 201, a center position 202UC of an upper portion 202U of the arc-extinguishing rotating disk 202 is connected to the upper cover 215 of the lightning protector housing 215 via the rotating shaft 214, the arc-extinguishing rotating disk 202 can rotate around the rotating shaft 214, and the planar torsion spring 204 for rotating the arc-extinguishing rotating disk 202 is provided at a central position 202C of the arc-extinguishing rotating disk 202, a lower portion 202L of the arc-extinguishing rotating disk 202 is substantially in contact with a protruding gasket 211 provided at the arc-extinguishing cylinder within the lightning protector housing 201, and has a gap with a non-protruding portion 201NP within the lightning protector housing 201; the conductive metal plate 203 is mounted at the upper portion of the arc-extinguishing rotating disk 202; several arc-extinguishing air-jet members 205 are provided around a circumferential direction of the arc-extinguishing rotating disk 202, each of the arc-extinguishing air-jet members 205 is provided with an L-shaped trigger electrode 206 and a recess 213 on one side thereof, and the L-shaped trigger electrode 206 has one end connected to one of triggering ends of the arc-extinguishing air-jet member 205 by means of a second wire W2, and a rear portion of the L-shaped trigger electrode extends beyond an edge 202E of the arc-extinguishing rotating disk 202; the other triggering end of the arc-extinguishing air-jet member 205 is connected to the conductive metal plate 203 via a third wire W3.

In the lightning induction-type solid-phase arc-extinguishing lightning protector, a unique fastening and unfastening mode is adopted, that is, when the arc-extinguishing air-jet member 205 is in the air-jet member triggering position, the rear portion 206R of the L-shaped trigger electrode 206 is fastened by the fastening rod 208 until the arc-extinguishing air-jet member 205 is triggered, the arc-extinguishing air-jet member 205 generates strong airflow after being triggered, so that the L-shaped trigger electrode 206 at the recess 213 is bent along the recess 213, the rear portion 206R of the L-shaped trigger electrode 206 is retracted into the arc-extinguishing rotating disk 202 so as to be unfastened successfully such that the arc-extinguishing rotating disk 202 can be rotated through the planar torsion spring 204 until the next arc-extinguishing air-jet member 205 enters the air-jet member triggering position, and the L-shaped trigger electrode 206 matched with the arc-extinguishing rotating disk 202 is again fastened by the fastening rod 208.

Figure 2:
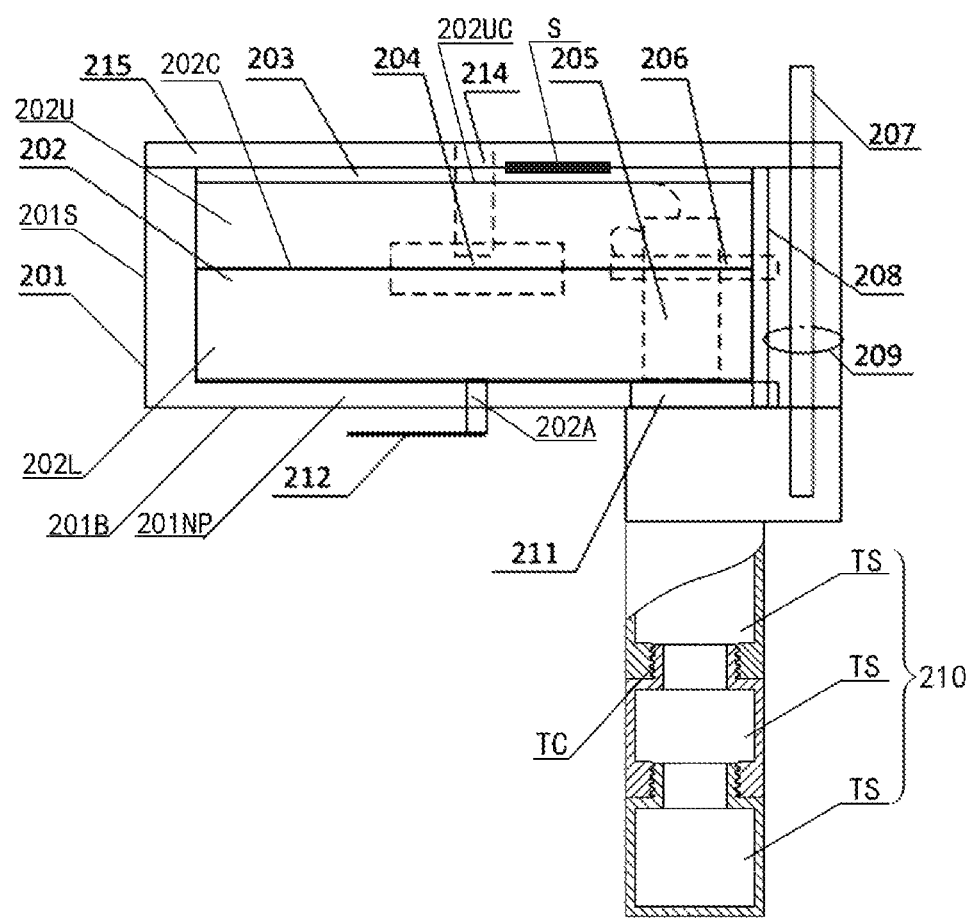
FIG. 2 is a structural diagram of an embodiment of the present disclosure.
Figure 3:
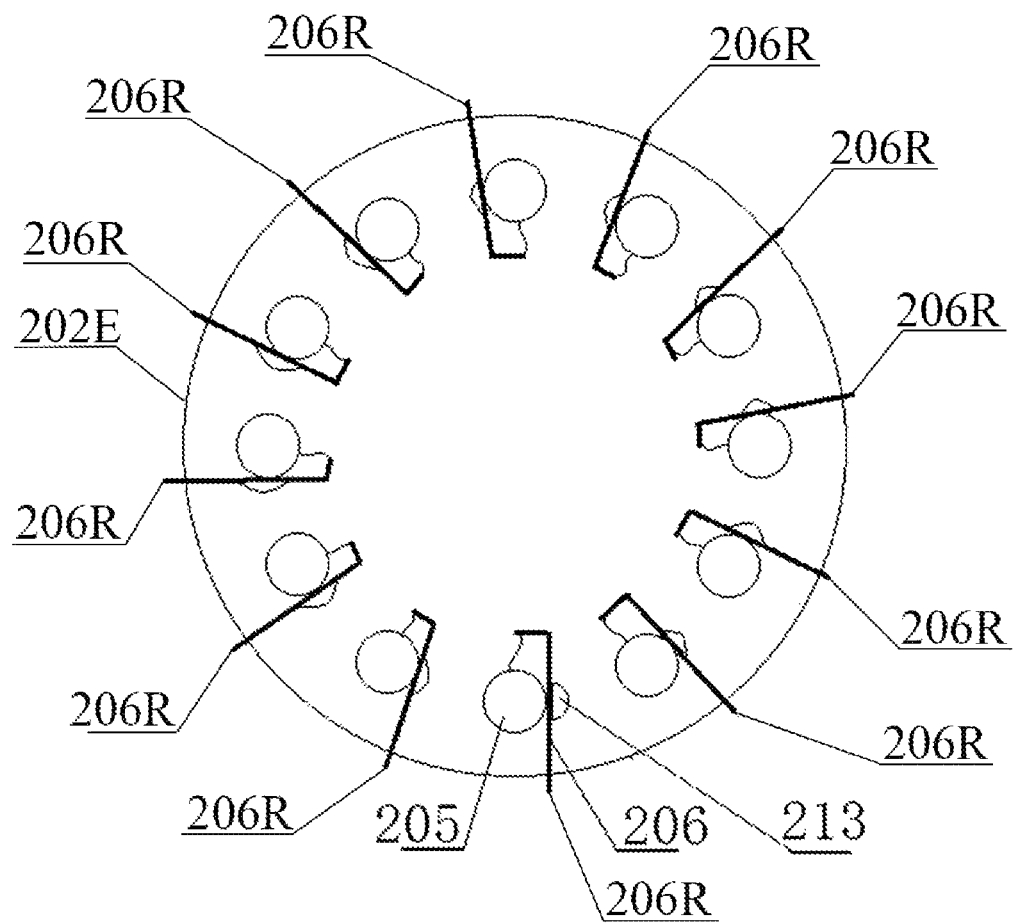
FIG. 3 is a structural diagram of the arrangement of the arc-extinguishing air-jet members of the arc-extinguishing rotating disk according to an embodiment of the present disclosure.
Figure 4:
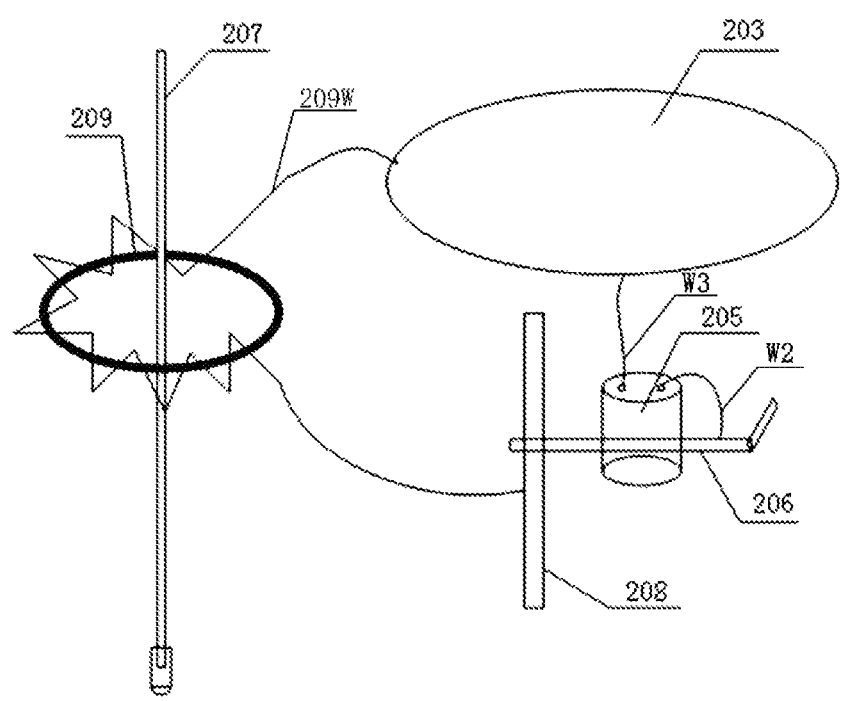
FIG. 4 is a schematic diagram of the current path of the lightning induction-type solid-phase arc-extinguishing lightning protector according to the present disclosure.

The bottom 201B of the lightning protector housing 201 is provided with a numeral mark or a mark of different colors. The recess 213 is a semi-circular recess. The fastening rod 208 and the arc-striking rod 207 are both copper metal rods. The lightning protector housing 201 and the upper cover 215 are connected by a shaft S, and the arc-extinguishing rotating disk 202 is replaced by flipping the upper cover 215. The reference number S in FIG. 2 representing the shaft is a schematic and in no way is meant to represent a particular orientation, size, or other physical characteristic of the shaft.

In the installation of this embodiment, the opening of the arc-extinguishing cylinder 210 is directed to the high voltage electrode 3 mounted on the transmission line below.

Embodiment 2

The present embodiment is similar to embodiment 1 except that the bottom 201B and side 201S of the lightning protector housing 201 are provided with numeral marks.

Embodiment 3

The present embodiment is similar to embodiment 1 except that the side of the lightning protector housing 201 is provided with colored marks. The arc-extinguishing cylinder 210 adopts a three-segment structure TS, that is, three segments of the arc-extinguishing cylinder are connected by a thread connection TC. The reference numbers TS and TC in FIG. 2 representing the three-segment structure is a schematic and in no way is meant to represent a particular orientation, size, or other physical characteristic of the three-segment structure and thread connection.

What is claimed is:

1. A lightning induction-type solid-phase arc-extinguishing lightning protector, fixedly mounted at one end of an insulator string by means of a link fitting, comprising:
a lightning protector housing,
an arc-extinguishing rotating disk,
a conductive metal plate,
a planar torsion spring,
an arc-striking rod,
a fastening rod,
an inductive coil,
an arc-extinguishing cylinder,
a counter arm,
an upper cover and a rotating shaft;
wherein an air-jet member triggering position is provided at the bottom of the lightning protector housing, and the arc-extinguishing cylinder is mounted below the air-jet member triggering position;
the fastening rod is fixedly mounted at the edge of the air-jet member triggering position;
the arc-striking rod has one end connected to the link fitting and the other end extending through the inductive coil to the arc-extinguishing cylinder;
one end of a first wire of the inductive coil is connected to the fastening rod, the other end thereof slidably contacts the conductive metal plate;
the arc-striking rod passes through the inductive coil, the counter arm is provided below the lightning protector housing and fixed to an axis position of the arc-extinguishing rotating disk;
the arc-extinguishing rotating disk is mounted within the lightning protector housing, a center position of an upper portion of the arc-extinguishing rotating disk is connected to the upper cover of the lightning protector housing via the rotating shaft, the arc-extinguishing rotating disk can rotate around the rotating shaft, and the planar torsion spring for rotating the arc-extinguishing rotating disk is provided at a central position of the arc-extinguishing rotating disk, a lower portion of the arc-extinguishing rotating disk is in direct contact with a protruding gasket provided at the arc-extinguishing cylinder within the lightning protector housing, and has a gap with a non-protruding portion within the lightning protector housing;
the conductive metal plate is mounted at the upper portion of the arc-extinguishing rotating disk;
several arc-extinguishing air-jet members are provided around a circumferential direction of the arc-extinguishing rotating disk, each of the arc-extinguishing air-jet members is provided with an L-shaped trigger electrode and a recess on one side thereof, and the L-shaped trigger electrode has one end connected to one of triggering ends of the arc-extinguishing air-jet member by means of a second wire, and a rear portion of the L-shaped trigger electrode extends beyond an edge of the arc-extinguishing rotating disk; and
the other triggering end of the arc-extinguishing air-jet member is connected to the conductive metal plate via a third wire.

2. The lightning protector of claim 1, having a fastening and unfastening mode, wherein
when the arc-extinguishing air-jet member is in the air-jet member triggering position,
the rear portion of the L-shaped trigger electrode is fastened by the fastening rod until the arc-extinguishing air-jet member is triggered,
the arc-extinguishing air-jet member generates strong airflow after being triggered, so that the L-shaped trigger electrode at the recess is bent along the recess,
the rear portion of the L-shaped trigger electrode is retracted into the arc-extinguishing rotating disk so as to be unfastened successfully such that the arc-extinguishing rotating disk can be rotated through the planar torsion spring until the next arc-extinguishing air-jet member enters the air-jet member triggering position, and
the L-shaped trigger electrode matched with the arc-extinguishing rotating disk is again fastened by the fastening rod.

3. The lightning protector of claim 1, wherein the bottom and side of the lightning protector housing is provided with a numeral mark or a mark of different colors.

4. The lightning protector of claim 1, wherein the recess is a semi-circular recess.

5. The lightning protector of claim 1, wherein the fastening rod includes an iron metal rod or copper metal rod, and the arc-striking rod includes an iron metal rod or copper metal rod.

6. The lightning protector of claim 1, wherein the arc-extinguishing cylinder has a three-segment structure connected by a thread connection.

7. The lightning protector of claim 1, wherein the lightning protector housing and the upper cover are connected by a shaft, and the arc-extinguishing rotating disk is replaced by flipping the upper cover; or
the lightning protector housing is assembled by two or more parts, each part is also connected by a shaft, and the arc-extinguishing rotating disk is replaced by rotating one part or several parts.

8. The lightning protector of claim 1, wherein the lightning protector has cooperation modes with a lower electrode:

a. the lightning protector is mounted at upper end of the insulator string, and a pure arc-striking electrode is mounted at lower end of the insulator string;

the lightning protectors are respectively mounted on both the upper end and lower end of the insulator string.

9. The lightning protector of claim 8, wherein cooperation mode b is used for transmission lines with a voltage level higher than 220 kV, and the lightning induction-type solid-phase arc-extinguishing lightning protectors are respectively mounted at both the upper end and lower end of the insulator string.

10. The lightning protector of claim 1, wherein the bottom or side of the lightning protector housing is provided with a numeral mark or a mark of different colors.

\* \* \* \* \*